UNITED STATES PATENT OFFICE 2,478,871

ALKYLENE OXIDE CONDENSATION PRODUCTS OF ALIPHATIC ACYL GUANYLUREAS

Donald W. Kaiser and Jack T. Thurston, Riverside, Conn., assignors to American Cyanamid Company, New York, N. Y., a corporation of Maine No Drawing. Application February 2, 1946, Serial No. 645,252

4 Claims. (Cl. 260—404.5)

This invention relates to condensation products of higher aliphatic acylguanylureas, in which the aliphatic radical contains 8 or more carbon atoms, with lower alkylene oxides such as ethylene oxide, propylene oxide, butylene oxide, epichlorhydrin and the like. The invention includes the condensation products themselves and wetting, emulsifying and textile-softening compositions containing them.

In our copending application Serial No. 463,666 filed October 28, 1942, now U. S. Patent No. 2,397,667, and also in our copending application Serial No. 645,251 filed February 2, 1946, and now abandoned, we have shown that the higher aliphatic acylguanylureas are readily obtained in good yields by hydrolyzing the corresponding aliphatic acyldicyandiamides in acid solutions. The aliphatic acylguanylureas in which the aliphatic radical contains at least 8 carbon atoms are relatively water-insoluble, and are precipitated from aqueous solutions by neutralization of their acid salts with a base such as sodium or ammonium hydroxide.

We have now discovered that by condensing these higher aliphatic acylguanylureas with lower alkylene oxides or their derivatives such as ethylene oxide, propylene oxide, butylene oxide, epichlorhydrin and the like, hydrophilic or water-solubilizing groups can be introduced to impart definite surface-active properties. We find that by starting with aliphatic acylguanylureas in which the aliphatic radical contains at least 8 carbon atoms and preferably about 10-18 carbon atoms, compounds having wetting, dispersing and textile-softening properties are obtained when a minimum of about 4-6 and preferably about 8-20 mols of ethylene oxide are combined with one mol of the guanylurea. With aliphatic acylguanylureas of higher molecular weight, in which the aliphatic radical contains 16-20 or more carbon atoms, it is sometimes advisable to use even larger proportions of ethylene, propylene, or butylene oxide, and where water-soluble products are desired we may use as much as 50 mols of ethylene or propylene oxide for each mol of the higher aliphatic acylguanylureas.

The condensation reaction between the higher aliphatic acylguanylurea and the lower alkylene oxides containing 2-4 carbon atoms; i. e. ethylene oxide, propylene oxide, butylene oxide and their halogenation products such as epichlorhydrin is preferably carried out by suspending the guanylurea in a suitable solvent and introducing the alkylene oxide compound. The condensation reaction may be carried out under a wide variety of operating conditions, depending on the type of reagent and the number of lower alkyl oxide molecules to be combined. In most cases satisfactory results are obtained by operating at atmospheric pressures and temperatures varying from about 20°–100° C., but when relatively large quantities of the alkylene oxide on the order of 15–30 or more mols of alkylene oxide are to be combined with one mol of the guanylurea it is sometimes preferable to operate under superatmospheric pressures up to about 5–6 atmospheres. Under these conditions reaction temperatures up to 150°–160° C. may be employed.

The alkylene oxide condensation is preferably carried out in the presence of a polar solvent such as ethyl alcohol or one of the propyl or butyl alcohols, and if desired a basic condensation catalyst may be added to increase the speed of the condensation reaction and avoid the necessity of using superatmospheric pressures. For example it is known that about 1% of sodium ethyl alcoholate will function as a catalyst for the condensation of ethylene oxide with amides of higher fatty acids, and we find that this catalyst can also be used in condensing ethylene oxide with the higher alkyl acyl guanylureas. Even better results are obtained by using tertiary amines such as triethylamine as catalyst, particularly in conjunction with the use of tertiary butanol as solvent as illustrated in the accompanying examples. However, lower alkylene oxide condensations using this class of catalysts and solvents are not claimed specifically in the present application, since they are claimed in a copending application of J. J. Carnes, Serial No. 677,523 filed June 18, 1946.

From the foregoing discussion it is evident that any aliphatic acylguanylurea in which the aliphatic radical contains at least 8 carbon atoms may be condensed with a lower alkylene oxide, or halogen substitution product thereof, to form the water-soluble products of the present invention. Lower aliphatic acylguanylureas, in which the aliphatic radical contains less than 8 carbon atoms, are not included within the scope of the present invention because they are in most cases water-soluble, and therefore need not be solubilized by alkylene oxide condensation. The products of the present invention may therefore be defined as water-soluble etheneoxy condensation products of water-insoluble aliphatic acylguanylureas. These compounds can be expressed by the formula

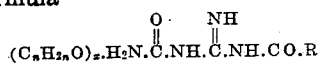

in which $n$ is a whole number from 2–4 inclusive, $x$ is a number from 4–50 inclusive, and $R$ is an aliphatic radical containing at least 8 carbon atoms. The preferred compounds of our invention are those corresponding to the above formula in which $R$ contains about 10–18 carbon atoms, and particularly the lauroyl, myristoyl, oleyl and stearoyl derivatives of guanylurea, since these are easily prepared from the acid chlorides of the corresponding fatty acids of vegetable origin and in which $x$ is a number from 8 to 30 inclusive. Surface-active agents having good wetting and softening properties for textiles are obtained from these preferred starting materials by condensing them with about 8–20 mols of ethylene oxide, or with about 12–30 mols of propylene oxide for each mol of the acylguanylurea.

The invention will be illustrated in greater detail by the following specific examples to which, however, it is not limited.

Example 1

Pelargonyldicyandiamide was prepared by reacting 2 molecular proportions of pelargonyl chloride with 4 mols of dicyandiamide and 5 mols of potassium hydroxide in acetone solution. The powdered dicyandiamide, potassium hydroxide and acetone were stirred together vigorously at room temperature for one hour, the mixture was then cooled to 5° C. and the pelargonyl chloride was added slowly while keeping the temperature below 10° C. More acetone was then added and the stirring was continued for an additional one-hour period after which water was added and the mixture made neutral with acetic acid and filtered. The filter cake was slurred in water, again filtered, and dried at 60° C.

A mixture of 100 grams of the pelargonyldicyandiamide with 60 grams (0.6 mol) of HCl in 500 cc. of water was heated under reflux for 15 minutes after a clear solution had been obtained. The mixture was then cooled, neutralized with ammonium hydroxide and filtered. The solids were suspended in water and again filtered, and the solid pelargonylguanylurea was dried and recrystallized from methyl ethyl ketone. Its melting point was then 131°–133° C.

A 30-gram portion of the pelargonylguanylurea was suspended in a mixture of 75 cc. of tertiary butanol and 15 cc. of triethylamine. Upon heating to 70° C. the slurry clarified whereupon ethylene oxide gas was bubbled through the solution for about 4.5 hours. During this time the temperature was maintained at 70°–80° C. and 41 grams of ethylene oxide were absorbed, this being about 8.5 mols of ethylene oxide for each mol of the guanylurea. The solvent was then removed by distillation at reduced pressure and the condensation product was obtained as an orange viscous liquid, which was soluble in cold water to form solutions which foamed on shaking, and which possessed good wetting and softening properties for cotton and rayon fabrics.

Example 2

Lauroyldicyandiamide, prepared from 3 gram mols of lauroyl chloride, 6 gram mols of dicyandiamide and 7.5 mols of KOH in 5 liters of acetone by the procedure described in Example 1, was hydrolyzed to lauroylguanylurea. Thus, 40 grams of the lauroyldicyandiamide, 20 grams (0.2 mol) of HCl and 300 cc. of water were used, the mixture being refluxed 15 minutes, neutralized with ammonium hydroxide, filtered and the product recrystallized twice from alcohol.

A 47 gram portion of the lauroylguanylurea was suspended in a mixture of 100 cc. of tertiary butanol and 15 cc. of triethylamine, heated to 70°–80° C., and condensed with 75 grams of ethylene oxide at this temperature during about 6 hours. The solvent was then distilled off at reduced pressure and the condensation product, which contained 10 mols of combined ethylene oxide for each mol of guanylurea, was obtained as a dark red, water-soluble liquid. The wetting properties of a sample were determined by the Draves test with the following results:

| % Concentration | 0.5 | 0.3 | 0.2 | 0.1 |
|---|---|---|---|---|
| Wetting time, seconds | 11.5 | 32.3 | 46.7 | 50.3 |

Example 3

Another sample of the lauroylguanylurea of Example 2, weighing 57 grams, was condensed with 53 grams of ethylene oxide to form a product containing 6 mols of combined ethylene oxide for each mol of the guanylurea. The Draves test gave the following results:

| % Concentration | 0.5 | 0.3 | 0.2 | 0.1 |
|---|---|---|---|---|
| Wetting time, seconds | 6.8 | 40.6 | 51.0 | 54.9 |

Example 4

Myristoylguanylurea was prepared by the hydrolysis of myristoyldicyandiamide, the latter being prepared from 2 gram mols of $C_{13}H_{27}COCl$, 4 gram mols of dicyandiamide, 5 gram mols of KOH and 5 liters of acetone by the method described in Example 1. The free base upon crystallization from alcohol had a melting point of 125°–128° C. and a nitrogen content of 17.8%.

A product containing 10 mols of combined ethylene oxide for each mol of guanylurea was obtained by suspending 62.4 grams of the myristoylguanylurea in a mixture of 100 cc. of tertiary butanol and 15 cc. of triethylamine, heating to 70°–80° C. and passing in ethylene oxide gas for 7 hours, during which time 89 grams were absorbed. Upon removal of the solvent the product was obtained as a red, water-soluble liquid. The following results were obtained when a sample was subjected to the Draves test:

| % Concentration | 0.5 | 0.4 | 0.2 | 0.1 |
|---|---|---|---|---|
| Wetting time, seconds | 26.1 | 36.2 | 58.8 | 107.8 |

Example 5

Coconut fatty acid chlorides were prepared by adding 137.4 grams of $PCl_3$ rapidly to 413 grams of coconut fatty acids at about 70° C. followed by heating for one hour at 70°–85° C. The fatty acid chlorides were decanted from the phosphoric acid and reacted with 336 grams of powdered dicyandiamide and 330 grams of potassium hydroxide in 4 liters of acetone by the procedure described in Example 1. The product was hydrolyzed by suspending in dilute aqueous hydrochloric acid and heating for 10 minutes after a clear solution was obtained. After neutralization with ammonium hydroxide the resulting guanylurea of coconut fatty acids was filtered off, dried and crystallized from alcohol.

A 40 gram sample of the product was condensed with 44 grams of ethylene oxide during 6 hours, using the procedure described in preceding examples, and the product was tested as a softener for cotton and rayon cloth. The cloth was impregnated with a 2% aqueous solution of the coconut fatty acid-guanylurea-ethylene oxide condensation product, run through a wringer set to retain 40% of solution in the cloth, dried and heated 5 minutes at 250° F. to set the finish. The cloth was then found to have a desirable soft and elastic hand.

What we claim is:

1. Water-soluble etheneoxy condensation products of water-insoluble aliphatic acylguanylureas corresponding to the formula $$(C_nH_{2n}O)_x.H_2N.\overset{O}{\underset{\|}{C}}.NH.\overset{NH}{\underset{\|}{C}}.NH.CO.R$$

in which $n$ is a whole number from 2–4 inclusive, $x$ is a number from 4–50 inclusive, and R is an aliphatic radical containing from 8 to 18 carbon atoms.

2. Water-soluble ethylene oxide condensation products of water-insoluble aliphatic acylguanylureas in which the aliphatic radical contains from 8 to 18 carbon atoms said condensation products containing 4–50 mols of combined ethylene oxide.

3. A water-soluble ethylene oxide condensation product of lauroylguanylurea said condensation product containing 4–50 mols of combined ethylene oxide.

4. A water-soluble ethylene oxide condensation product of myristoylguanylurea said condensation product containing 4–50 mols of combined ethylene oxide.

DONALD W. KAISER.
JACK T. THURSTON.

REFERENCES CITED

The following references are of record in the file of this patent:

UNITED STATES PATENTS

| Number | Name | Date |
|---|---|---|
| 2,315,765 | Bindler | Apr. 6, 1943 |
| 2,386,937 | De Groote et al. | Oct. 16, 1945 |
| 2,375,533 | De Groote et al. | May 8, 1945 |
| 2,423,643 | Ericks | July 8, 1947 |